Aug. 16, 1960  W. W. CARRUTHERS ET AL  2,948,970
SONAR TRAINER

Filed Nov. 23, 1948  6 Sheets-Sheet 2

INVENTORS
WALTER W. CARRUTHERS
CLAUDE L. KIRKPATRICK
BY George Sipkin
George E. Pearson
ATTORNEYS Aug. 16, 1960   W. W. CARRUTHERS ET AL   2,948,970
SONAR TRAINER Filed Nov. 23, 1948   6 Sheets-Sheet 3

INVENTORS
WALTER W. CARRUTHERS
CLAUDE L. KIRKPATRICK
BY George Sipkin
George E. Pearson
ATTORNEYS Aug. 16, 1960  W. W. CARRUTHERS ET AL  2,948,970
SONAR TRAINER
Filed Nov. 23, 1948  6 Sheets-Sheet 4
Fig. 6
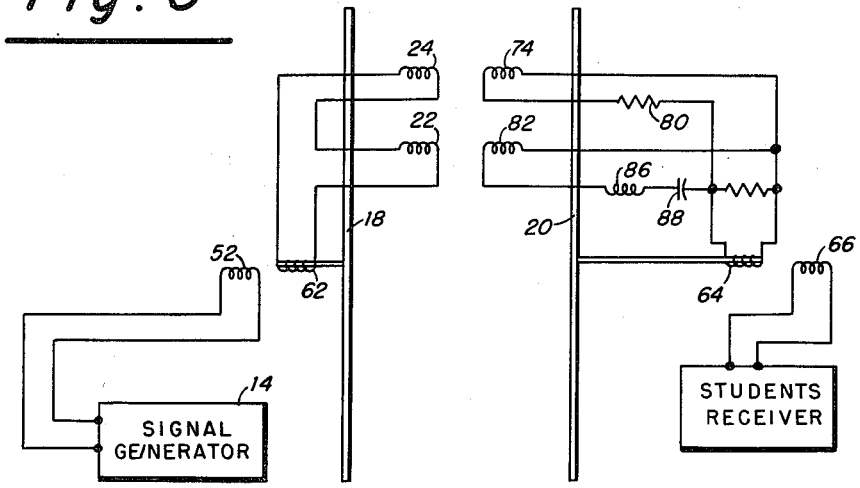
Fig. 8
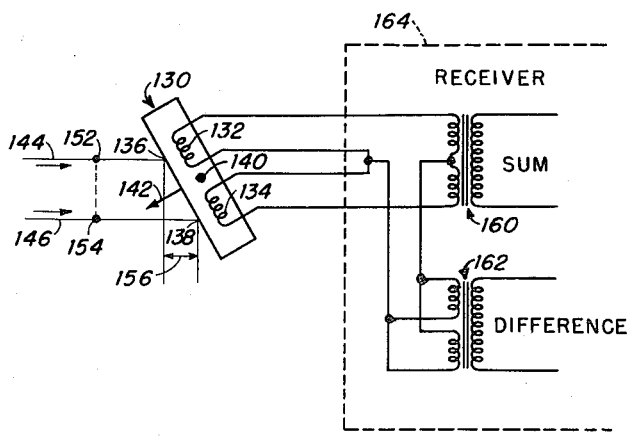
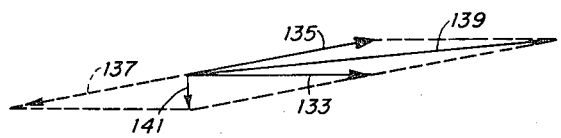
Fig. 9
INVENTORS
WALTER W. CARRUTHERS
CLAUDE L. KIRKPATRICK
BY
ATTORNEYS

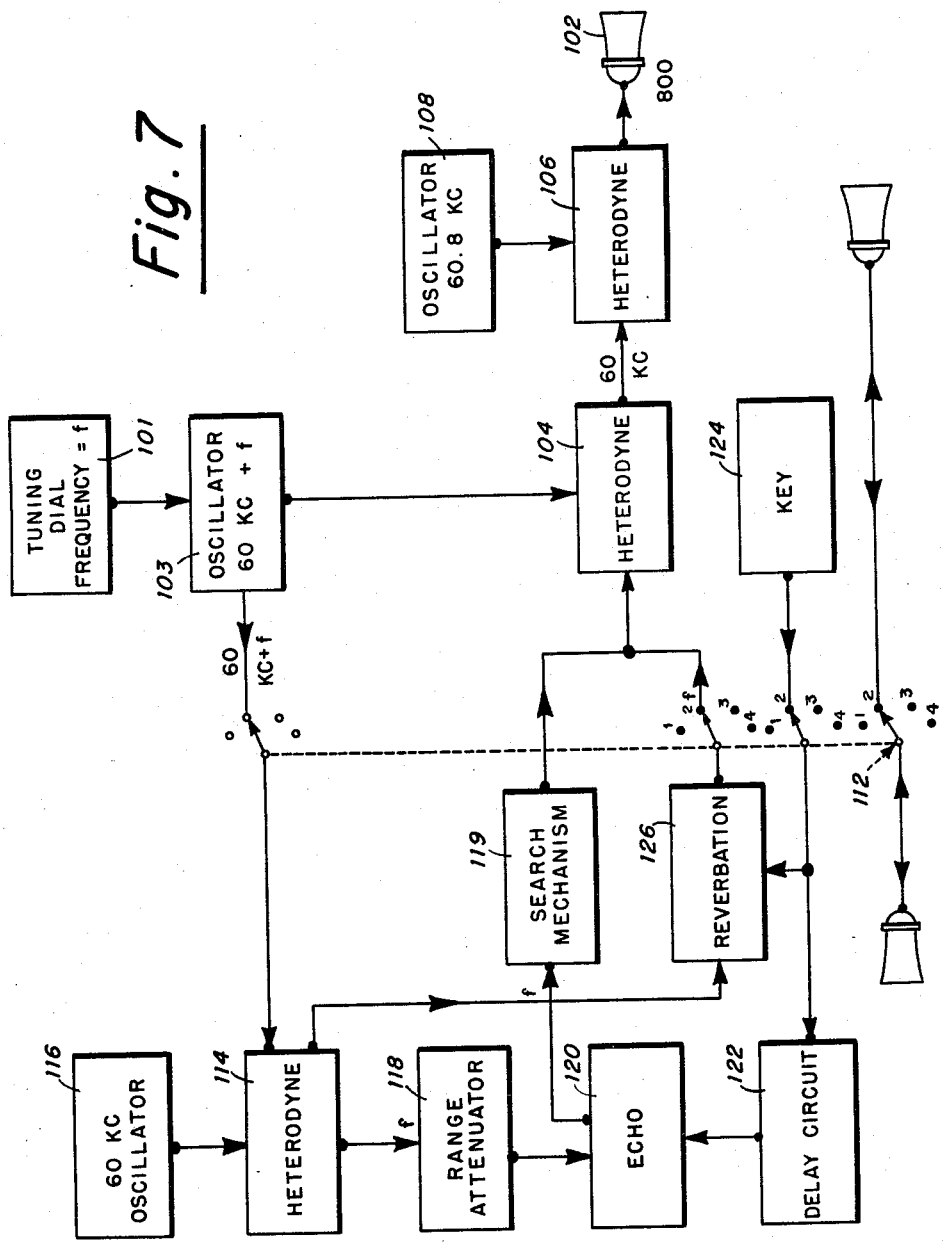

Aug. 16, 1960    W. W. CARRUTHERS ET AL    2,948,970
SONAR TRAINER
Filed Nov. 23, 1948    6 Sheets-Sheet 6
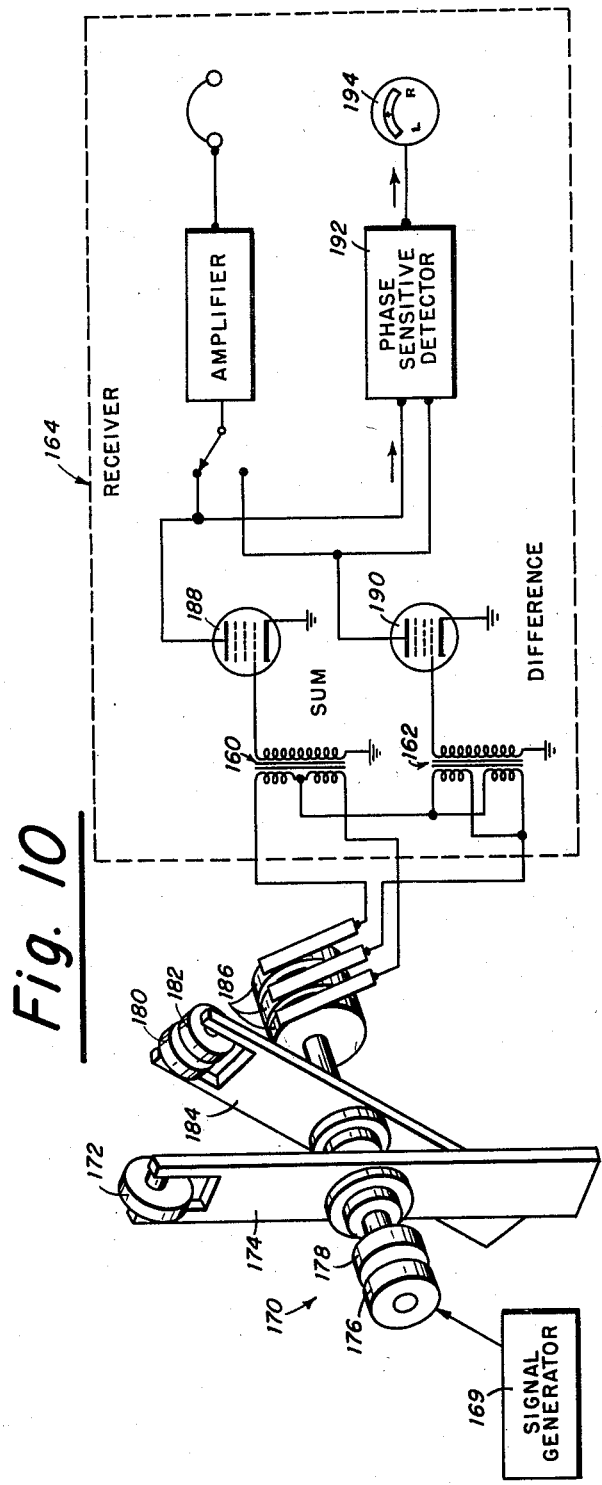
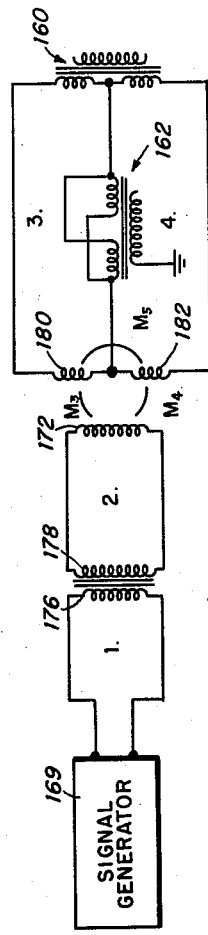
INVENTORS
WALTER W. CARRUTHERS
CLAUDE L. KIRKPATRICK
BY George Sipkin
George E. Pearson
ATTORNEYS United States Patent Office 2,948,970
Patented Aug. 16, 1960

2,948,970

SONAR TRAINER

Walter W. Carruthers, Los Angeles, and Claude L. Kirkpatrick, San Diego, Calif., assignors to the United States of America as represented by the Secretary of the Navy Filed Nov. 23, 1948, Ser. No. 61,568

6 Claims. (Cl. 35—10.4)

The present invention is related to practice devices for the training and drilling of operators of underwater listening and echo-ranging gear.

Listening equipment is used on submarines for listening to the water-born noises from other ships and for taking bearings on them. One type of such equipment includes an electromechanical transducer, or hydrophone, mounted outside the hull of the ship for responding to sounds in the water and for transmitting them as electric signals to the operator's amplifier. The signal passes through a heterodyne circuit to produce audible sounds from supersonic frequencies in the range of 13 to 36 kilocycles per second. The operator listens to a band of frequencies about 3 kc. wide and has a tuning control for shifting this 3 kc. band to any part of the 13 to 36 kc. range.

The hydrophone is directional in that it receives sounds best from some one direction. It is this directional selectivity that enables the operator to find the bearing of a target surface ship. He does so by simply finding the direction in which the hydrophone must face to bring the noise of the target in loudest. One characteristic of equipment of this type is that a transducer that has a sharp directional selectivity will also show extra lobes in its directivity pattern. That is, there will be several separate directions in which the hydrophone shows good sensitivity.

Good design keeps the sensitivities of the unwanted lobes lower than that of the forward lobe but cannot eliminate them. Thus in one type of transducer a side lobe, sensitive enough to be noticeable, appears about 30° to each side of the main lobe and another appears 180° from it. It is necessary that the operator be alert to these difficulties and that he be skilled in the operating procedures that will prevent them from leading him into errors.

The sharpness of the directional sensitivity of a transducer is in general greater for high frequency sounds. Consequently the operator can obtain a sharper indication of target bearing if he listens, at say 33 kc. rather than 15 kc.

Certain types of equipment are provided with sensitive devices for indicating whether the operator has his hydrophone facing slightly to the right or left of the source of a particular underwater noise. When properly used such aids materially increase the accuracy of the bearing measurements.

Listening procedures thus will enable a submariner to determine the bearing of a target-surface-ship but will not show its range, or distance, from the submarine. Submarines may also be equipped with echo-ranging equipment which consists of an apparatus for sending sound pulses, or pings, into the water and for determining the time required for their echoes to return from the target. But, in warfare it is undesirable for a submarine to send out echo-ranging pings because they may be heard by other ships. One compromise of this difficulty requires that the submarine sound-operator first determine the bearing of the target by listening, and then, after obtaining specific orders from his commander, he direct a single ping toward that bearing to determine the range.

It is an object of the present invention to provide equipment for drilling sound operators in the procedures for meeting these specific problems.

It is a further object to provide a shore-based system employing operators' stations of the regular ship board type to thereby improve the realism and effectiveness of the training.

It is a further object to provide apparatus on which many students may practice independently at the same time.

Further objects include the provision of improved equipment for training sound operators, and the provision of improved electrical apparatus for the purposes described.

These and other objects and advantages will appear from the following description of one specific embodiment of the invention. In the drawings:

Fig. 6 is a schematic diagram of a part of the system shown in Fig. 1.

Fig. 7 is a schematic diagram showing the echo-ranging portion of a system of the present invention.

Figs. 8 and 9 are diagrams for showing one type of underwater listening device, and for explaining its operation.

Fig. 10 is a diagram of apparatus of the present invention for simulating the operation of the apparatus of Fig. 8.

Fig. 11 is a circuit diagram for explaining the operation of the system of Fig. 10.

Figure 1:
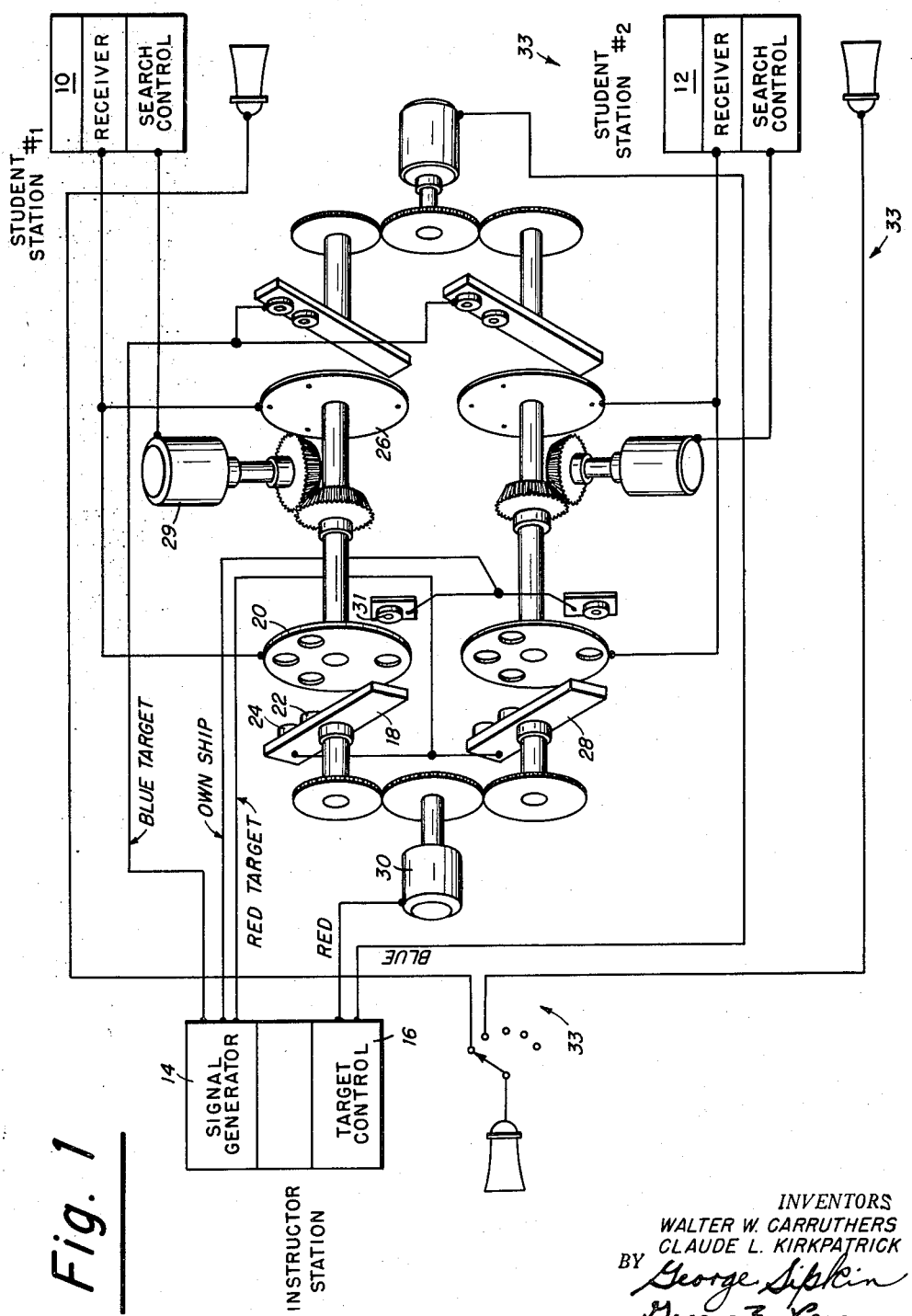
Fig. 1 is a partially schematic diagram showing the listening portion of a system of the present invention.

The system of Fig. 1 includes two sound equipments 10 and 12 of a type that is used aboard ship. Each constitutes a student's station of the training equipment and each includes an electronic receiver and a search control panel. An instructor's station includes a signal generator 14 and a target bearing control panel 16. A search mechanism includes a target simulating member 18 and a hydrophone simulating member 20 set close to each other and rotatable independently about a common axis. The target member 18 carries induction coils 22 and 24 energized from the signal generator 14, and the hydrophone simulating member 20 carries coils which are adapted to be rotated in and out of inductive coupling with the coils 22 and 24 for transmitting signals to the receiver of the student's station 10. A total of four such pairs of coil supports are provided so that each of the two students receives signals from both of two simulated targets. Thus the student's station 10 receives signals from two simulated hydrophones 20 and 26, one of which picks up signals from each of the two targets.

A training control of the conventional type, which includes a "selsyn" motor 29 permits control of the two simulated hydrophones 20 and 26 from the search panel of student's station 10. The other student's station 12 controls the other pair of simulated hydrophones similarly. The coil supports 18 and 28, one for each of the two students, are driven by a single motor 30 controlled from the bearing control panel 16 of the instructor's station. As indicated in Fig. 1, the coils carried by these two supports 18 and 28 simulate the so-called red target for the two students.

The uppermost position of the search mechanism corresponds to the forward direction of the submarine from which the student is presumed to be searching. When the coils 22 and 24 are uppermost the red target is forward. To add to the problem the sounds characteristic of the listener's own ship a stationary induction coil 31 is placed at the lowermost position near the simulated hydrophone 20. The target signal from the signal generator 14 of Fig. 1 is fed through wires to an induction coil 52 which surrounds the shaft 54 that supports the target member 18. This coil 52 is supported on an insulating block 56 which in turn is supported on the same supporting structure 58 that supports the bearings 60 for the shaft 54. A second induction coil 62, also surrounding the shaft 54, is fastened to that shaft and rotates with it. Coil 62 lies close to coil 52 so as to have good inductive coupling with it. Signal voltages thus generated in coil 62 by the electric current in coil 52 are conducted by wires to the two target simulating coils 22 and 24.

The hydrophone simulating disk 20 similarly employs a pair of induction coils for bringing the signal out to the stationary equipment. One coil 64 which rotates with the disk 20 receives current from the various pickup coils on the disk and induces signal voltages in a stationary coil 66 mounted on the same supporting frame that carries the bearings 68 for the shaft 70 that carries disk 20. The pair of coils, such as 52 and 62, constitute a very good arrangement for transmitting the signal from the stationary to the rotating part of the apparatus. Unlike slip rings and sliding contacts, it is trouble-free and introduces no extraneous noise to the circuit.

Figure 4:
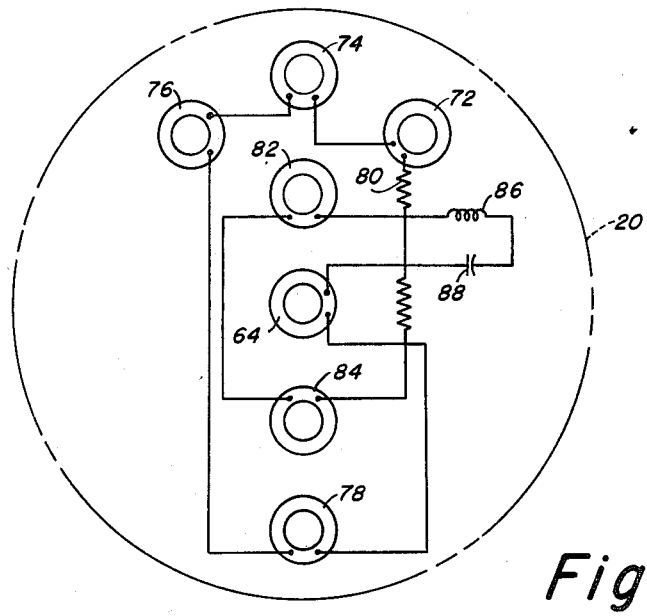
Fig. 4 is a view of the hydrophone-simulating element of the search mechanism of Fig. 2.

The arrangement of the pick-up coils on the disk 20 can be seen best in Fig. 4. There, the central coil shown in the diagram is the coil 64 of Fig. 2 which provides the output coupling from the disk. Connected across the terminals of this coil is a group of four coils, 72, 74, 76 and 78 and also a resistor 80. Notice that these four coils all lie near the periphery of disk 20. Connected also across the terminals of coil 64, and therefore in shunt with the four outer coils, is an inner group of two coils 82 and 84, and also a reactance coil 86 and a condenser 88. The reactor 86 and condenser 88 resonate near 12 kc. per second. They control the impedance of the circuit through the coils 82 and 84 so that it responds well to frequencies in the lowest part of the 13-to-36 kc. operating range of the equipment, and shows progressively less voltage output as the frequency increases.

Figure 2:
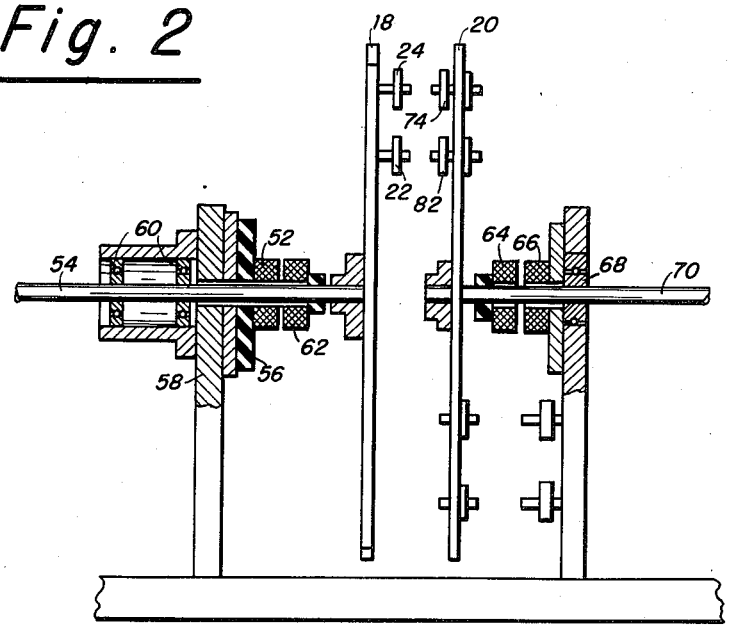
Fig. 2 is an elevational view, partially in section, of the search mechanism from Fig. 1.

Coils 74 and 82 are pickup coils for simulating the front, or main, sensitivity-lobe of the simulated hydrophone. When the simulated hydrophone is trained on the target, these coils 74 and 82 lie opposite the coils 24 and 22 respectively of the target simulator 18, as shown in Fig. 2. Similarly coils 78 and 84 constitute pickup coils for simulating the rear sensitivity-lobe. Thus when the hydrophone is faced away from the target-bearing, coils 78 and 84 will lie opposite the coils 24 and 22 of the target member to pick up a signal just as a signal is picked up by the rear face of actual listening equipment. Similarly pickup coils 72 and 76 produce the effect of a side lobe approximately 30° on each side of the front lobe.

Figure 3:
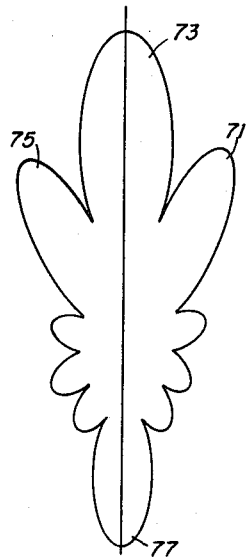
Fig. 3 is a graph showing the sensitivity pattern of a typical, underwater, listening hydrophone.

Fig. 3 is a sensitivity diagram for a hydrophone of the type that is simulated by the construction of Fig. 4. The upward direction in the chart represents the forward direction from the hydrophone, the downward direction on the chart represents the rearward direction of the hydrophone, and the intermediate angles on the chart represent intermediate directions from the hydrophone. The distance out from the center represent relative sensitivities of the hydrophone. The curve constitutes a plot of sensitivity versus direction from the hydrophone for which the sensitivity scale is in decibels. Notice that the greatest sensitivity is in the forward direction as shown by the largest lobe 73, but that appreciable sensitivity-lobes, 71, 75 and 77 appear at the sides and in the rearward direction. It is this sensitivity characteristic that the assembly of Fig. 4 is intended to simulate. The lower sensitivity of the side lobes and the rear lobe as compared to the main lobe, is to be obtained by preventing the pick-up coils that correspond to those side and rear lobes from approaching as close to the coils on the target member as do the pickup coils that correspond to the main lobe. To this end the various pick-up coils on the simulated hydrophone 20 are adjustable radially for regulating the minimum distances to which they approach the coils on the target member.

Figure 5:
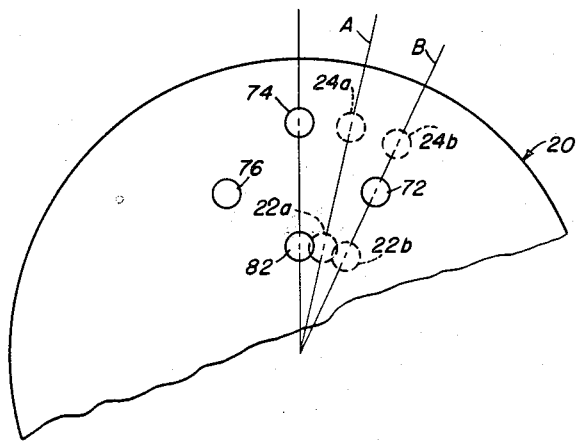
Fig. 5 is a diagram illustrating the operation of the apparatus of Fig. 4.

Fig. 5 shows typical positions of the pickup coils on the simulated hydrophone 20. Shown in dotted lines are two different positions that the target coils may take relative to the pickup coils during the operation of the equipment. Reference numeral 24A indicates the position of coil 24 when the target member is in position A in Fig. 5. It is to be recalled that the two shafts 54 and 70 shown in Fig. 2, on which target member 18 and the simulated hydrophone 20 are mounted, are coaxial. As may be seen from the position 24A, the front-lobe coil 74 lies at substantially the same distance from the center as does target coil 24. However, slide-lobe coil 72 lies somewhat closer to the center and consequently never passes as close to coil 24 as does coil 74.

The operation of the central coil 82 can also be explained best with reference to Fig. 5. Since coils 24 and 74 lie farther from the axis of rotation than do coils 22 and 82 they move farther apart for a given relative rotation of the hydrophone and target member, and therefore reduce their inductive coupling more. Thus at position A coils 24 and 74 have separated so that there is very little coupling between them, while coils 22 and 82 still have appreciable coupling. Coil 82 because it is in series with the resonant elements 86 and 88 shown in Fig. 4, responds predominantly to frequencies in the low end of the operating range of the equipment. Consequently these low frequencies are audible to the operator over a wider angle of train than are the high frequencies which are transmitted predominantly by coil 74. This action simulates the action of actual hydrophones which exhibit wider sensitivity lobes at low frequencies than they do at high.

Fig. 6 is a simplified schematic of the signal channels through the search mechanism. As indicated there, the target sounds from signal generator 14 are conducted to induction coil 52 which energizes coil 62 which in turn conducts the signal to the two coils 22 and 24 on the rotatable target member 18. The two pick-up coils 74 and 82, which provide the front sensitivity lobe of the simulated hydrophone 20, picks up signals from the coils 22 and 24 and conduct them to induction coil 64 from which the signals are picked up by coil 66 and conducted to the student's receiver. The signals are made audible to the student operator by a loud speaker. It is to be noted that the outer coils 24 and 74 on the target member 18 and simulated hydrophone 20 constitute one signal channel for the target sounds and that the two inner coils 22 and 82 constitute a second signal channel for the same sounds, but that the induction coil 86 and condenser 88 give to this second channel different transmission characteristics than are exhibited by the channel through coils 24 and 74. That is, the two channels have different frequency discriminating characteristics.

Fig. 7 is a simplified schematic diagram showing the facilities for drilling the student in the single-ping technique of taking ranges. This figure shows certain of the elements that are included in the regular sea going type of equipment that constitutes the student's station. The student's receiver includes a tuning dial 101 which is graduated in frequency from 13 kc. per second to 36 kc. per second to indicate at each setting, the particular incoming frequency that produced an 800 cycle note in the loud speaker 102. This tuning-dial frequency is called "f" in Fig. 7. An oscillator 103 controlled by the tuning dial 101 operates at a frequency of 60 kc. greater than that indicated on the dial. This frequency is used to control a heterodyne frequency-converter 104. Thus when the tuning dial is set at 24 kc., oscillator 103 operates at 84 kc. and a 24 kc. signal would be converted at 104 to 60 kc. This signal then would pass through a second converter 106 which is driven from an oscillator 108 operating at 60.8 kc. so that the output signal to speaker 102 would be 800 cycles per second. This equipment just described is a part of the student-operator's station and it is desirable to make use of this standard equipment without changing it. To this end connections are provided between each student's station and the instructor's station. A gang switch 112 enables the instructor to switch to any one of the several students' stations (of which only one is shown in Fig. 7). The output of the student's oscillator 103 is mixed at 114 with a 60 kilocycle signal from oscillator 116 to produce a tone having the frequency "f" indicated on the student's tuning dial. This signal then passes through an attenuator 118 and an electronic switch 120 and then is conducted through search mechanism 119 to the heterodyne converter 104 at the student's station to produce an 800 cycle tone in the speaker 102. The electronic switch 120 is controlled by a delay circuit 122 which in turn is controlled by the key 124 at the student's station. Key 124 also controls a second electronic switch 126 for controlling a simulated reverberation which is applied directly to the student's receiver. The apparatus 119 is the search mechanism of Figs. 2, 4 etc. The construction and operation of attenuator 118, electronic switches 120 and 126, and delay circuit 122 are shown and described in the prior application Serial No. 535,858, filed May 16, 1944, now Patent No. 2,854,764. In using the single-ping feature of the apparatus the instructor turns the switch 112 to the particular student-station from which he wants the range report and, using the talking circuit, orders the student to take a range. The student actuates his key 124 which initiates the operation of the delay circuit 122 and also causes switch 126 to pass reverberation noise to his (the student's) heterodyne circuit 104 which constitutes a part of his receiver. He hears this reverberation regardless of the direction in which he has his simulated hydrophone (search mechanism 119) pointed, just as he would at sea. After the proper delay as determined by the presumed range of the target, delay circuit 122 actuates switch 120 to transmit an echo-simulating note to the target coils of search mechanism 119. If the student has his simulated hydrophone trained on the correct target-bearing, this echo signal comes through to the heterodyne converter 104 of his receiver amplifier. The student then determines the target range from the length of time that elapsed between the actuation of his key 124 and he return of the simulated echo, and he reports this range-measurement over the talking circuit to the instructor.

Since the signals of each target are supplied to the search mechanisms of all the students, the echo signal generated in response to the ping of any one student can be heard by all other students who happen to be then listening to that target, but that effect truly simulates sea conditions.

The reverberation tone from electronic switch 126 is heard only by the one student who is then taking the range. Although this signal may be transmitted back through the search mechanism 119 of the student who is taking the range and then through the search mechanisms of all the other students to their receivers, the signal suffers a loss of about 100 db in each search mechanism so that it is at least 200 db down and therefore inaudible against the target noise, at the receivers of the other students.

Since the heterodyne converter 114 utilizes the output of oscillator 103 of the student's station, the system automatically gives the simulated echo and the reverberation signals the correct frequency. The attenuation 118 reduces the intensity of the echo-signal to simulate the effect of range, which of course, is under the control of the instructor.

Fig. 8 shows diagrammatically a portion of another type of underwater listening equipment, the operation of which must be simulated in the shore-based trainer of the present invention. A hydrophone, or underwater type of electromechanical transducer, 130 comprises two identical and symmetrically—arranged halves 132 and 134 having effective centers at 136 and 138, and having separate electric-output circuits. The whole hydrophone rotates about a vertical axis 140.

This divided construction gives the hydrophone special directional properties. The hydrophone is said to "face" in the direction of the arrow 142. Consider a plane sound wave, indicated by the parallel rays 144 and 146, approaching the hydrophone from a direction slightly to the right of the direction in which the hydrophone is facing. A line perpendicular to these rays (called a wave front) connects points such as 152 and 154 that have the same phase. Because the hydrophone in Fig. 8 does not directly face the oncoming wave, each wave front reaches point 136 earlier than it reaches point 138 and consequently the voltages generated in the two halves of the hydrophone differ in phase by an angle determined by the distance 156 compared to the wave length of the sound. The output from 132 has the so-called "earlier" phase because at any instant it is responding to an earlier, or more advanced, portion of the sound wave than is the half 134.

The electrical outputs from the halves 132 and 134 of the hydrophone, or transducer 130, are resolved into sum and difference signals by similar transformers 160 and 162 which constitute part of a receiver 164. Because the outputs of 132 and 134 are equal in magnitude and differ only in phase, the sum and difference voltages will always be separated 90° in phase. Thus, in Fig. 9, vectors 133 and 135 represent the voltage outputs from the halves 132 and 134 respectively, and vector 139 is their sum. Vector 137 is drawn in to indicate the negative of vector 135. Vector 141 is the sum of vectors 133 and 137 and therefore the difference of vectors 133 and 135. It is perpendicular to vector 139. The receiver 164 includes a phase-sensitive detector that responds only to these quadrature voltages for actuating an indicator that shows accurately whether the hydrophone is facing slightly to the right or left of the source of sound.

The present invention provides a realistic operation of such a receiver without making any changes in the receiver itself, and without having to provide equal, out-of-phase signals. In Fig. 10 a search mechanism 170 includes a target coil 172 carried on a rotatable arm 174 and energized by a part of induction coils 176 and 178 which are similar to coils 52 and 62 of the device of Figs. 2 and 6. A pair of pick-up coils 180 and 182 lie next to each other and are carried by arm 184 to pass near target coil 172. The voltages induced in coils 180 and 182 produce currents that flow out through collector rings 186 to the transformers 160 and 162 of receiver 164. These transformers drive the control grids of similar vacuum tubes 188 and 190.

When the arms 174 and 184 are parallel so that the target-simulating coil 172 lies close to, but equidistant from pick-up coils 180 and 182, it induces voltages in those coils that are equal in both phase and magnitude. This situation simulates the condition in which the hydrophone of Fig. 8 faces the source of sound. When the coils 172, 180 and 182 are moved slightly away from this symetrical "on-target" position, the voltage induced in one coil reduces in magnitude relative to the other but the two voltages maintain substantially the same phase. However the constants of the various circuits are so arranged that this condition does produce voltages in transformers 160 and 162 that are out-of-phase and so capable of operating the phase-sensitive detector 192 and the right-left indicator 194.

The circuits involved in the search mechanism 170 and the transformers 160 and 162 are shown schematically in Fig. 11, where the meshes are number 1, 2, 3 and 4. In this system the ratio of the currents in meshes 3 and 4 is $$\frac{I_3}{I_4} = \frac{B_{44}M_3/M_4 + B_{34}}{B_{33} + B_{43}M_3/M_4}$$

where:

$I_3$ and $I_4$ = mesh currents in meshes 3 and 4 respectively
$B_{33}$ = self impedance of mesh 3, that is the reciprocal of the ratio of the current in that mesh to the voltage induced by it in that same mesh
$B_{44}$ = self impedance of mesh 4
$B_{34} = B_{43}$ = mutual impedance of meshes 3+4, that is the reciprocal of the ratio of the current in one mesh to the voltage induced by it in the other mesh
$M_3$ = mutual inductance between coils 172 and 180 in Fig. 11
$M_4$ = mutual inductance between coils 172 and 182 in Fig. 11

When the coils 172, 180 and 182 occupy their symmetrical, "on target" position the mutual inductances $M_3$ and $M_4$ are equal. The equation shows that the ratio $I_3/I_4$ is unity for this condition. That is, $I_3$ and $I_4$ are equal in both phase and magnitude. At any other position of the coils 172 etc. the ratio $M_3/M_4$ will be some real number other than unity. In the present system the mutual and self impedances of the two meshes 3 and 4 are comparable in magnitude and different in phase (or power factor). Therefore as the ratio $M_3/M_4$ in the equation departs from unity, the ratio $I_3/I_4$ becomes complex. A complex value for this ratio means that the currents in meshes 3 and 4 in Fig. 11 differ in phase and so will actuate the indicator 194 of Fig. 10. For example in one specific construction, at 7000 cycles per second (a suitable signal frequency for the equipment), coils 180 and 182 each had a resistance of 50 ohms and an inductance of .05 henry and therefore an impedance of $50 + j\ 220$. $M_5$, the mutual inductance between coils 180 and 182 was .028 henry so that it provided a coupling impedance of $j\ 125$ ohms. Each half of transformer 160 had an impedance of about $20 + j\ 100$ ohms, and the transformer provided a coupling impedance of $j\ 100$ ohms. The impedance of transformer 162 was about $12 + j\ 100$ ohms.

$B_{44} = B_{33} = 62 + j\ 420$ ohms
   $= 425$ ohms at $82°$
$B_{43} = B_{34} = -12 + j\ 125$ ohms
   $= 125$ ohms at $96°$ The term "target" is not limited to enemy ships but includes any craft or other object the presence or location of which can be determined by means of sound.

The term "sensitivity lobe" as applied to the response pattern of a transducer is the phenomena of the response at a certain bearing being greater than that a bearings at the right and left of it, and includes not only the so called main, or front, lobe but also the so called rear, or reciprocal, lobe and the side lobes.

The invention is not to be limited to the details of the specific constructions herein shown and described, but should be limited only to the scope of the appended claims.

We claim:

1. In combination in a search mechanism for a training device, a movable member, another member, a first pair of coils, a respective one of said first pair of coils mounted on each of said members whereby said coils pass near each other and have appreciable inductive coupling over a portion of the range of movement of said member, a second pair of coils, a respective one of said second pair of coils mounted on each of said members whereby they pass near each other and have appreciable inductive coupling at the center part of said portion of the range of movement, whereby each of said pairs of coils constitutes a separate signal channel, circuit connections for operating these two signal channels in parallel, and means for making the transmission and frequency discriminating characteristics of the two channels different.

2. The combination of claim 1 wherein the movable member is mounted to rotate about an axis, and wherein said two pairs of coils are similar in construction but the first pair of coils is closer to said axis than the second pair.

3. The combination of claim 1 wherein there is included tunable means for imposing a frequency discrimination upon the combined signal of said two channels and for varying the pattern of that discrimination.

4. In combination a training device for simulating a search, a rotatable search member, a rotatable target member, an induction coil on one of said members, a plurality of induction coils on the other member distributed about the axis of rotation in accordance with the angular position of the sensitivity lobes of a transducer, said coil on said one member being arranged to come into inductive relationship with each of said plurality of coils in succession as one of said members is rotated, means for adjusting the relative values of maximum couplings of each of these coils to the first mentioned coil, and signal means for transmitting electric signals from one of said members to the other through the inductive coupling of said coils, to simulate the detection of signals from a target.

5. The combination of claim 4 wherein there is included a stationary coil positioned to have inductive coupling with a coil of the rotatable search member at one angular position thereof and a source of elternating current voltage simulating a propeller noise signal connected to said stationary coil, whereby to simulate the noise from own propellers in underwater listening.

6. In combination with a search mechanism for a training device, a source of alternating current, a first rotatable member, a first induction coil secured to said first rotatable member at a point laterally displaced from the axis of rotation thereof and connected to said source of alternating current, a second rotatable member in axial alignment with said first rotatable member, a plurality of second induction coils secured to said second rotatable member at points laterally displaced from the axis of rotation thereof, said first and second induction coils being inductively related during an arcuate portion of their relative rotation, whereby a voltage is induced in said second induction coil indicative of the relative position of said first and second rotatable members during said arcuate portion of their relative rotation.

References Cited in the file of this patent

UNITED STATES PATENTS 2,407,282   Johnson _____ Sept. 10, 1946
2,425,102   Larson _____ Aug. 5, 1947